United States Patent
Sweeney et al.

(10) Patent No.: US 9,003,033 B2
(45) Date of Patent: Apr. 7, 2015

(54) IP SESSION-BASED REGULATION AND BILLING

(75) Inventors: Jeffrey M. Sweeney, Olathe, KS (US); Kelsyn D. S. Rooks, Overland Park, KS (US); William T. Stelle, Lenexa, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 1175 days.

(21) Appl. No.: 12/476,803

(22) Filed: Jun. 2, 2009

(65) Prior Publication Data

US 2010/0306367 A1    Dec. 2, 2010

(51) Int. Cl.
- G06F 15/173 (2006.01)
- G06Q 30/04 (2012.01)
- G06Q 50/32 (2012.01)
- H04L 29/08 (2006.01)

(52) U.S. Cl.
CPC ............... G06Q 30/04 (2013.01); G06Q 50/32 (2013.01); H04L 67/104 (2013.01); H04L 67/303 (2013.01); H04L 67/141 (2013.01); H04L 67/1085 (2013.01)

(58) Field of Classification Search
CPC . H04L 67/303; H04L 67/141; H04L 67/1085; H04L 67/104
See application file for complete search history.

(56) References Cited

U.S. PATENT DOCUMENTS

| | | | |
|---|---|---|---|
| 6,219,710 B1 | 4/2001 | Gray et al. | |
| 6,751,216 B2 | 6/2004 | Johnson et al. | |
| 7,137,144 B1* | 11/2006 | Attwood et al. | 726/13 |
| 7,349,327 B2* | 3/2008 | Puon et al. | 709/221 |
| 7,464,272 B2 | 12/2008 | Danieli | |
| 7,522,591 B2 | 4/2009 | Kiyoto et al. | |
| 7,873,736 B1* | 1/2011 | Sethi et al. | 709/224 |
| 2003/0226032 A1* | 12/2003 | Robert | 713/200 |
| 2007/0258361 A1* | 11/2007 | McEwen | 370/229 |
| 2010/0145912 A1* | 6/2010 | Li et al. | 709/224 |
| 2012/0072592 A1* | 3/2012 | Lidstrom et al. | 709/224 |

OTHER PUBLICATIONS

"Broadband Internet Access," http://en.wikipedia.org/wiki/Broadband_Internet_access, pp. 1-11, printed on May 5, 2009.
"Core Router," http://en.wikipedia.org/wiki/Core_router, pp. 1-3, printed on May 5, 2009.
"Deep Packet Inspection," http://en.wikipedia.org/wiki/Deep_packet_inspection, pp. 1-6, printed on May 5, 2009.
"File Sharing," http://en.wikipedia.org/wiki/File_sharing, pp. 1-6, printed on May 6, 2009.
"Peer-to-Peer", http://en.wikipedia.org/wiki/Peer-to-peer, pp. 1-12, printed on May 6, 2009.

* cited by examiner

Primary Examiner — Patrice Winder
Assistant Examiner — Nam Tran
(74) Attorney, Agent, or Firm — Swanson & Bratschun, L.L.C.

(57) ABSTRACT

Among other things, there are disclosed structures, systems and methods for monitoring and regulating access by consumers to computer network bandwidth, particularly with regard to peer-to-peer file sharing. A router (in certain embodiments, a core router) is programmed with a predetermined number of open or open and active internet protocol (IP) sessions a particular computer is allowed. Requests to open sessions that do not exceed that number are permitted. Requests to open sessions that exceed that number may be rejected, or an offer obtain additional session(s), perhaps with additional payment, may be made.

17 Claims, 2 Drawing Sheets

IP SESSION-BASED REGULATION AND BILLING

The present disclosure concerns access to internet protocol (IP) sessions from a user's terminal. In particular, the following disclosure discusses methods and systems for controlling and billing for IP sessions opened or sought to be opened from a user's terminal.

BACKGROUND

Internet access has become practically ubiquitous in most of the world through a variety of access points. From dial-up access via Public Switched Telephone network (PSTN) lines to broadband access via landed cable, wireless system or satellite connection, more people than ever have the ability to use the internet and related computer networks. The uses are many, from communications and correspondence to research and information access.

Among these uses is the broad category of information or file sharing, which can involve information in a variety of forms. Data, articles, or similar information can be made available to small groups or the entire world from a local machine or centralized host, by way of IP access. That is, by entering the appropriate IP address, website name or host name, a user at a terminal can access via the internet the files stored in or accessible to the host.

Peer-to-peer (P2P) networks or connections generally involve interconnectedness of individual computers with each other, rather than having individual computers linked only to a central host or server (a "server-based" network or "client-server" setup). In this way, each computer functions as both a host or server and as a client. There is no central server or router to handle all transmissions to and from each "peer" computer. Some P2P networks may be considered "hybrid," in that they have some characteristic(s) of a client-server system, such as a central server that keeps information relating to some or all of the peer computers. Many P2P networks may also include non-peer elements such as DNS (Domain Name System). Advantages of P2P systems include distribution of resources among a number of more or less equivalent structures, rather than in one central server. Failure of one "peer" is much less serious than failure of a central server. Addition of new "peers" in a P2P system results in increased capacity, whereas addition of clients to a server in a client-server system may overload the server.

File sharing via P2P is quite popular among consumers to upload and download many types of data, including video, music and other content. Many content providers are encouraging such file sharing for distribution of their content as a way to shift costs, particularly the costs of providing bandwidth, to internet service providers (ISPs). For example, software providers have discovered the usefulness of networks for distribution of software, rather than using packaged physical media, such as compact discs. However, there are few if any options to regulate and quantify for billing purposes the use of P2P file sharing.

In the standard protocol, P2P network users open multiple IP sessions to upload and/or download data or other files from the network. While most individuals may use several open IP sessions when browsing (e.g. separate open windows for news and weather, plus background sessions for downloaded advertising), other content uploaders or downloaders may open dozens of IP sessions for transferring information. Applications such as BitTorrent™ and eMule use many open IP sessions, some or all in the background, in transferring information. Each of these sessions is of relatively low bandwidth, but the combination of these sessions results in high bandwidth usage. While ISPs can limit or restrict the overall bandwidth available to a customer via a bandwidth cap, such a limitation applies to all the usage on that customer's connection. Thus, limiting bandwidth to a customer in order to limit P2P file sharing may cause disruptions or increased latency in high-bandwidth applications like video streaming. Further, ISPs or others can control or regulate traffic by its content or type via deep packed inspection (DPI), but doing so raises privacy issues with the potential for liability.

Thus, there remains a need for a solution to the overuse of bandwidth in P2P file sharing while not impacting other high-bandwidth usage, locking down a customer's usable bandwidth, or creating privacy concerns, and for quantifying usage in that way.

SUMMARY

Among other things, there are disclosed methods in a computer network that include providing a router electronically connected to the network and to at least a first computer. The router includes programming that tracks the number of internet protocol sessions open to the first computer, and includes a predetermined and modifiable number of open IP sessions permitted for the first computer. Methods can also include receiving at the router a request from the first computer to open at least one new IP session; determining with the programming whether the opening of the at least one new IP session would result in the number of open IP sessions to the first computer being greater than the number of open IP sessions permitted for the first computer; and when the programming determines that the number of open IP sessions permitted for the first computer will not be exceeded, opening the at least one requested new IP session.

In certain embodiments, on a determination that the predetermined number of open IP sessions would be exceeded if all of the new IP sessions requested were opened, the programming permits opening of only so many of the new IP sessions requested as would not exceed the predetermined number of open IP sessions. The programming tracks the number of IP sessions both open to the first computer and actively transferring information, and the determining comprises determining with the programming whether the opening of the at least one new IP session would result in the number of IP sessions both open to the first computer and active in transferring information being greater than the number of open IP sessions permitted for the first computer. When the programming determines that the number of open IP sessions permitted for the first computer would be exceeded if all of the new IP sessions requested were opened, methods can include sending a notification of that determination. The notification may be sent to the first computer, and can include an offer to increase the predetermined number of IP sessions on remission of a payment. Where such payment is remitted, the router is notified of the payment, and the predetermined number of IP sessions is increased to a new predetermined number of open IP sessions. A controller in electronic communication with the router can be provided, with the controller providing the router with a message that includes the notification of the payment and an instruction to change the predetermined number of open IP sessions in the programming. The programming is or includes software, in some embodiments, that can be programmed remotely, and the router may be a core router.

Also disclosed herein are embodiments of an apparatus for use in a computer network, which includes a router having an input from one or more computers in the network. The router includes programming that identifies a number of permitted open IP sessions for a first of the computers. The programming is further adapted to maintain a count of the IP sessions open to the first computer, receive requests from the first computer to open IP sessions, and compare requests to open IP sessions from the first computer and the number of then-existing open IP sessions with the number of permitted open IP sessions, in determining whether to permit opening additional IP sessions to the first computer. The programming may further be adapted to send a message reporting a request to open one or more sessions in excess of the number of permitted open IP sessions. In certain embodiments, the programming is electronically connected to a controller, and the message is received by said controller. The controller can be programmed to be able to issue an instruction to the router to override the maximum number of permitted open IP sessions. The instruction to override might include reprogramming the programming so that the number of permitted open IP sessions is increased.

In certain embodiments, the router is a core router. The programming is adapted to maintain a count of the IP session that are both open to the first computer and active in transferring information, and to compare requests to open IP sessions from the first computer and the number of then-existing IP sessions that are both open to the first computer and active in transferring information with the number of permitted open IP sessions, in determining whether to permit opening additional IP sessions to the first computer. A controller electronically communicating with the programming in the router is programmed to send a report to the first computer in some embodiments when a request to open one or more sessions in excess of the number of permitted open IP sessions is received by said programming from the first computer.

The disclosed structure and methods provide, among other things, a viable bandwidth management solution for ISPs or others in the particular area of P2P file sharing, without the privacy issues and other negative aspects surrounding deep packet inspection (DPI) or placing special restrictions on available bandwidth to a given consumer. Rather than controlling bandwidth itself, the present methods and apparatus are designed to regulate the number of open network sessions that a computer can have. P2P file sharing, very popular in communicating video, music and other types of data content, can be more effectively managed by ISPs, resulting in more efficient use and assessment of costs for bandwidth. ISPs are able to create new service offerings to support bandwidth needs of P2P file sharing with the disclosed structure and methods.

DETAILED DESCRIPTION OF THE ILLUSTRATED EMBODIMENTS

Figure 1:
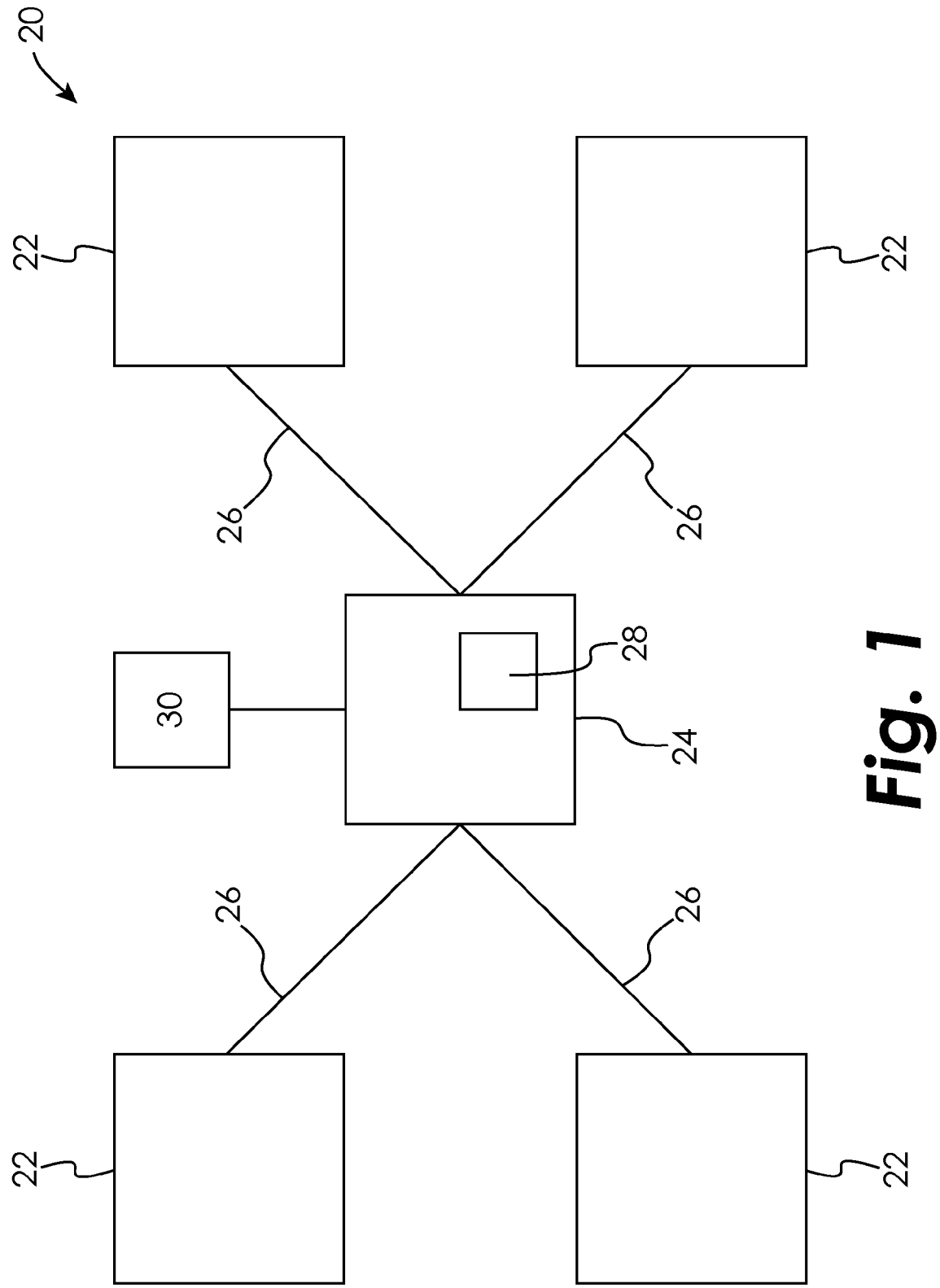
FIG. 1 is a schematic representation of apparatus and systems disclosed herein.

For the purposes of promoting an understanding of the principles of the disclosure, reference will now be made to the embodiments illustrated in the drawings and specific language will be used to describe the same. It will nevertheless be understood that no limitation of the scope of the claims is thereby intended, and alterations and modifications in the illustrated devices and methods, and further applications of the principles of the disclosure as illustrated therein are herein contemplated as would normally occur to one skilled in the art to which the disclosure relates.

Referring now to the Figures, there is shown an embodiment of systems and methods for quantifying and regulating access to bandwidth by computers such as those in a P2P network. A network 20 is schematically represented as including a plurality of individual computers or "peers" 22 electronically connected to each other via one or more routers 24 to form a peer-to-peer system. Network or system 20 is illustrated in essentially its simplest form, and it will be understood that that schematic representation is not limiting. A substantially more complex system involving many more computers 22, routers 24 and connections between them can use the methods and apparatus described herein.

Computers 22 may be PC-type individual machines used in homes or businesses, large-capacity servers, or other machines. Computers 22 are linked to router 24 via cable, DSL, T-1, wireless, satellite or other broadband connection (which may include a local router or other hardware), as indicated by lines 26. Appropriate software on computers 22 enable files to be downloaded from or uploaded to network 20 via these connections. Each of computers 22 has a unique IP address.

Router 24, in one embodiment, is a core router such as the Cisco Systems CRS-1 or the Juniper T-series, or a device having similar or better data transmission and/or programmability characteristics. Such routers are used as the backbone of the internet or other file sharing network, and as a central communicator within an ISP's internal communications. It will be seen that router 24 could be another type of router or data communication device, e.g. an edge router.

Router 24 includes programming 28 in the form of hardware, software and/or firmware for receiving and assessing requests from computers 22 to open IP sessions. In certain embodiments, programming 28 is software loaded into router 24 that can be modified by the ISP as needed. Programming 28 in a particular embodiment includes three levels of application. One level obtains and monitors information concerning the user's site, such as the number of computers 22 or IP addresses accessing the network, the number of open IP sessions, traffic characteristics, and the like. Deep-packet inspection (DPI) is not necessary, but information concerning the level of usage by the user is acquired by programming 28. Another level is a web services layer for administration and control of the traffic through router 24, particularly in opening new IP sessions for users. A third level is an interface for reporting events to the ISP and/or to the user. Exception reports when new IP sessions are not opened, traffic reports concerning the number of sessions open and active or the bandwidth in use, and billing reports or queries for extended use are examples of events that may be reported or otherwise acted upon. It will be seen that in other embodiments one or more of these levels of application may be absent or modified.

In certain embodiments, programming 28 includes a predetermined maximum number of IP sessions each computer 22 (with its unique IP address) may open. For example, the ISP may incorporate into an administration level of programming 28 that a particular computer 22 or IP address will be permitted a particular number of open IP sessions at any given time. In a case in which the user of the particular computer 22 or IP address has paid a base fee for access, the ISP will insert into programming 28 that the user is permitted a relatively low number of simultaneously open IP sessions, e.g. ten. If a higher fee is paid initially, or if an upgrade is purchased, then a higher number of simultaneously open IP sessions may be programmed by modifying programming 28 to an increased predetermined maximum number of sessions. Conversely, if a change to a lower number of accesses (e.g. a less-expensive plan) is desired, a modification to programming 28 can be made to decrease that predetermined maximum number of sessions.

Router 24 is connected to a controller 30 belonging to the ISP in certain embodiments. For example, in embodiments in which programming 28 includes the three levels of application noted above, controller 30 may receive information from router 24 concerning users' usage, provide commands and/or modifications to programming 28 in the administrative layer, and accept the reporting from the reporting layer of programming 28. When router 24 receives a request to open an IP session, programming 28 acts on it. If the request would result in exceeding the number of open (or open and active) IP sessions permitted for a particular computer 22 or IP address, programming 28 generates and sends a message to controller 30 advising of the situation. Controller 30 makes a determination as to whether to authorize changing the permitted number of open IP sessions for that particular computer 22 or IP address. If an increase is authorized, then controller 30 sends a signal to router 24 with an instruction to override and allow the new session(s) to be opened. In one embodiment, the instruction modifies programming 28 to a new predetermined number of permitted IP sessions. If an increase is not authorized, then controller 30 may send a signal indicating non-authorization to router 24, and router 24 either passes the signal on to the particular computer 22 or programming 28 transforms the signal into a message for that computer 22. In this way, the user of computer 22 is informed that the new IP session requested is not authorized.

Authorization by controller 30 for additional IP sessions, as discussed above, may depend on a payment or authorization for payment by the user of the particular computer 22. For example, when router 24 signals controller 30 of the request for additional IP session(s), controller 30 may send a signal or message to the particular computer 22. The signal or message may merely be passed through router 24, or it may be received by programming 28 and transformed into a message for the particular computer 22. In other embodiments, such a signal or message passes from controller 30 to the particular computer 22 via a path that does not go through router 24. The signal or message indicates the refusal to open new IP session(s) and may offer the opportunity to open the desired session(s) on payment or authorization of payment. For example, the user of the particular computer 22 can authorize the ISP to add charge(s) to the user's monthly bill in order to open new IP session(s). As another example, the user may provide a credit card number over a secure line (e.g. telephone) or computer link, to which a charge for additional session(s) would be billed. On receiving information reflecting such authorization or payment, controller 30 sends a signal to router 24 to change programming 28 to increase the predetermined number of IP sessions for the given computer 22.

To prepare the system 20, router 24 is provided with programming 28 as indicated above. Router 24 may be given particular hardware, e.g. integrated circuitry, a relevant portion of memory may be programmed with software, firmware may be provided, or a combination of them as a gatekeeper for requests from computers 22 to open IP sessions. The programming 28 has a connection to controller 30, as previously indicated, to pass to controller 30 information on activity and to receive from controller 30 signals concerning its performance and parameters. It will be understood that router 24 may be originally built with hardware, software and/or firmware including programming 28 as a part of it, or that memory, controller(s) or other parts of router 24 may be programmed with programming 28 after its initial construction and/or after it is in service for the ISP.

Figure 2:
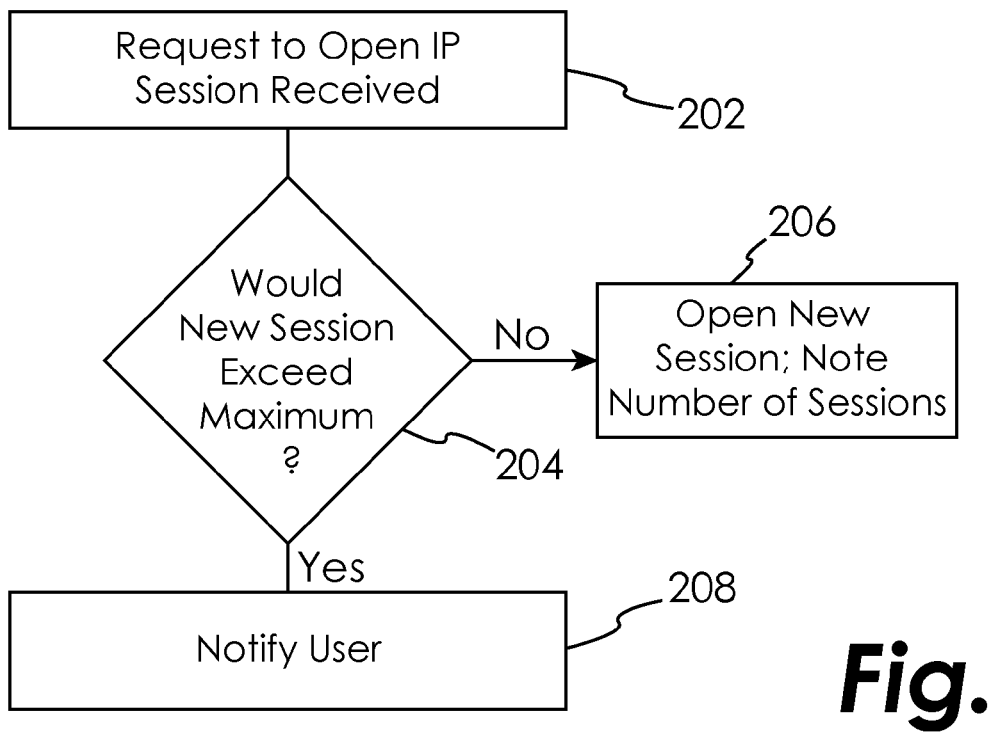
FIG. 2 is a flow chart indicating aspects of methods of using the apparatus and systems disclosed herein.

The description below focuses on the operation of router 24 and programming 28 with respect to a single computer 22, for ease and clarity of discussion. It will be seen that the same or similar steps can be performed on or for a number of other individual computers 22, or a group of computers 22 treated collectively, each connected to a given router 24. With reference to FIG. 2, programming 28 has a predetermined number of open IP sessions that it will permit to the given computer 22 or IP address. When that computer 22 or IP address requests to open one or more session(s), it sends a signal with the request to the ISP and it is received by router 24 (step 202). Programming 28 in router 24 receives the request and determines whether opening the requested session would result in a number of open (or open and active) sessions to that computer 22 that is greater than the predetermined number of permitted sessions (step 204). If opening the requested session(s) would not exceed the predetermined maximum, then programming 28 and router 24 pass on the request, resulting in new open session(s) (step 206). For example, where a particular computer 22 or IP address is permitted ten open IP sessions at a time, programming 28 will include that information. When the user of the particular computer 22 wishes to open a first IP session from that computer 22, the request is received by router 24 and its programming 28. Programming 28 determines that opening that first session would not exceed the session maximum, it passes on the request, and the user's session is opened. When the user wishes to open an eleventh session from that computer (e.g. he or she has ten sessions open and wishes to open another, or has nine sessions open and wishes to open two more, etc.), programming 28 receives that request and notes that it would result in a number of sessions greater than the predetermined maximum number. Programming 28 may pass along the request to the extent it does not open more than the maximum sessions, and does not allow opening more than that number of sessions.

Figure 3:
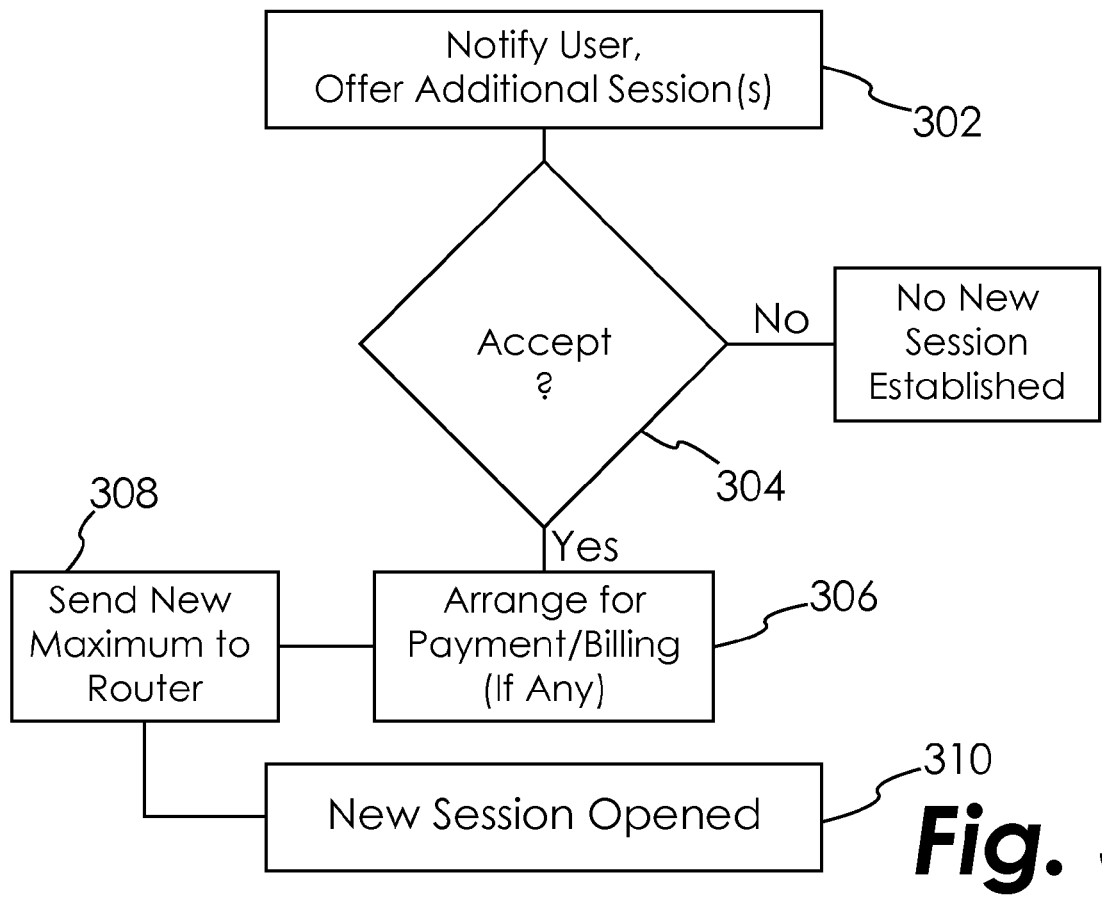
FIG. 3 is a flow chart indicating aspects of methods coordinating with aspects of the chart of FIG. 2.

In embodiments in which controller 30 is present, a request to open sessions greater than the predetermined maximum number results in programming 28 sending a signal or message advising controller 30 of that request. Controller 30 sends a signal or message to the user of the particular computer 22 (step 208). Referring now to FIG. 3, the signal or message may include not only a notification that the request for a new session(s) would exceed the maximum number permitted, but may also include an offer to increase the number of permitted sessions on payment or authorization of payment (step 302). The message may be sent to the particular computer 22, via router 24 or another path, or may be conveyed to the user of the particular computer 22 in another fashion. Continuing the example previously given, the user's request for an eleventh open session results in a message from controller 30 to the effect that opening the session exceeds the resources allocated for that computer 22, and offering the user the opportunity to obtain more open sessions. As a particular example, the message could offer a click-through opportunity to add a charge to the user's monthly bill, or could request a credit card or other payment number to which the charge would be added. An upgrade of service or additional charge could be made automatically if provided for in an appropriate user agreement. Where contemporaneous consent is needed, if the user consents to the charge (step 304), that information is conveyed to controller 30. Controller 30 then sends a signal or message to router 24 to change the predetermined maximum number of open sessions for that particular computer 22 to a larger number. If in the above example the user authorizes the charge for one additional open session (step 306), that information is passed to controller 30, which instructs programming 28 of router 24 to allow the new session (step 308), and a new session is opened (step 310). As noted above, in certain embodiments controller 30 reprograms part of programming 28 so that the predetermined number of permitted open sessions for the given computer 22 increases.

The ISP may set up its charging controls and pricing structures so as to permit one-time-only increases in the predetermined number of sessions permitted to a particular computer 22. In such a case, once the "excess" session(s) are terminated by the user, the predetermined permitted number of sessions will revert to its original level. Using the above example, once the user's eleventh session is ended, the predetermined permitted number of sessions for his or her computer will revert to ten if programming 28 has been modified, or will remain at ten if only an override command was given. Alternatively, the ISP may set up its controls so that payment of a charge results in a longer-term increase in the predetermined number of sessions permitted to the particular computer 22, e.g. for a one-month period, the user in the above example has a maximum of eleven sessions he or she can open at one time. This type of control may be considered an upgrade to a new service plan or similar offering by the ISP.

The above discussion describes a scenario in which the user attempts to open one or more IP sessions above the predetermined permitted number, and is either denied that opportunity or is given the chance to arrange for additional session(s) after the request. It will be seen that identical or similar structures and methods can be used to permit the user who knows ahead of time that he or she will need additional session(s) to contact the ISP electronically or otherwise and arrange for an increase in the number of permitted sessions before the needed sessions are requested. Further, the structures and methods herein may be used to create a "pay-as-you-go" type of service, so that consumers that generally need relatively few accesses can buy additional access if needed, but do not have to pay for multiple accesses (as part of an overall access plan) they do not use. Conversely, file sharing users or businesses that use P2P to download or upload software or other content can initially arrange with the ISP for a relatively large number of sessions for their machines or IP addresses.

While the discussion above considers payment for additional open IP sessions, it will of course be seen that additional IP sessions need not be exclusively offered for additional payment. As alternative examples, a user could access additional sessions so long as router 24 determines that enough bandwidth or other session-access is available. On receiving a request for a new IP session and determining that it would exceed the predetermined number for that particular computer 22, programming 28 examines the then-current usage of bandwidth by sessions running through router 24 and/or expected (e.g. trend-based) usage of bandwidth for router 24 at the particular time. Where the current or expected usage is such that the requested additional session can be easily accommodated (e.g. without significant loss of speed or efficiency or without resorting to additional or backup resources), then the requested session would be allowed by programming 28 and/or controller 30. Similarly, on receiving a request for an additional IP session and determining it would exceed the maximum for the particular computer 22, programming 28 and/or controller 30 could permit the particular computer 22 to use an available session of another user or computer. Conversely, at times or situations in which usage (actual or expected) is high, charges can be levied for additional sessions, as discussed above. In these examples, the same or similar structures and actions as those described above would be used, but the requirement of payment or authorization of payment may not be necessary.

The disclosed structure and methods allow the ISP to more carefully monitor the usage of its systems without monitoring content, to allot resources to those who pay for them, and to assess whether additional resources should be brought on-line. The disclosure permits the consumer to use available file-sharing technology, such as Hulu™ or YouTube®, with downloaded banners with their allotment of relatively few IP sessions. Access to more allowable sessions when needed is also available via an immediate (e.g. near real-time) bandwidth "boost" when the user elects it. Users who need more sessions on a consistent basis can make arrangements with the ISP for the same. Further, ISPs and consumers can benefit by more accurate charging for service used, so that consumers that use or need only one or two open sessions at a time can pay less than those needing more access.

It is also noted that "open" IP sessions may not be carrying traffic. For example, in some applications an IP session is opened for a banner or advertisement, but as soon as the content is loaded there is no further traffic. While that session may be open, it is not being used to transfer information, and thus is no drain on bandwidth. The structures and methods disclosed herein may be used to regulate not only "open" sessions, but may be oriented to regulate sessions that are both open and "active," i.e. handling information traffic. In such a situation, programming 28 would operate as noted above, except it would count not merely open sessions, but sessions that are being used to transmit data actively. Actions discussed above would be taken where programming 28 notes a request for an open and active session that would exceed the predetermined maximum number of open and active IP sessions.

Although the disclosed systems and methods have application to P2P traffic, the systems and methods may be used with any type of application that uses numerous IP sessions. In many embodiments, the system would not be aware of the type of traffic it is regulating, but would only be concerned with the number of sessions.

While the subject matter herein has been illustrated and described in detail in the exemplary drawings and foregoing description, the same is to be considered as illustrative and not restrictive in character, it being understood that only the preferred embodiment(s) have been shown and described and that all changes and modifications that come within the spirit of the disclosure are desired to be protected.

What is claimed is:

1. In relationship between an Internet service provider ("ISP") and a customer, a method comprising:
    providing a router electronically connected to a network of the ISP and to at least a first computer operated by the customer, the router providing a connection between the first computer and the network, said router including programming that tracks the number of internet protocol ("IP") sessions open between the first computer and the network, and includes a predetermined and modifiable number of open IP sessions permitted for the first computer, wherein the number of open IP sessions permitted depends on a level specified by a service plan between the customer and the ISP;
    receiving at said router a request from the first computer to open at least one new IP session;
    determining with said programming whether the opening of the at least one new IP session would result in the number of open IP sessions to the first computer being greater than the number of open IP sessions permitted for the first computer; and when the programming determines that the number of open IP sessions permitted for the first computer will not be exceeded, opening the at least one requested new IP session.

2. The method of claim 1, wherein on a determination that the number of open IP sessions permitted would be exceeded if all of the new IP sessions requested were opened, said programming permits opening of only so many of the new IP sessions requested as would not exceed the number of open IP sessions permitted.

3. The method of claim 1, wherein said programming tracks the number of IP sessions both open to the first computer and actively transferring information, and wherein said determining comprises determining with said programming whether the opening of the at least one new IP session would result in the number of IP sessions both open to the first computer and active in transferring information being greater than the number of open IP sessions permitted for the first computer.

4. The method of claim 1, wherein when the programming determines that the number of open IP sessions permitted for the first computer would be exceeded if all of the new IP sessions requested were opened, sending a notification of that determination.

5. The method of claim 4, wherein the notification is sent to the first computer, and includes an offer to increase the number of IP sessions permitted on remission of a payment.

6. The method of claim 5, wherein the payment is remitted, the router is notified of said payment, and said number of IP sessions permitted is increased to a new number of open IP sessions permitted.

7. The method of claim 5, wherein a controller in electronic communication with said router is provided, said controller providing the router with a message that includes the notification of the payment and an instruction to change the number of open IP sessions permitted in the programming.

8. The method of claim 1, wherein said programming comprises software that can be programmed remotely.

9. The method of claim 1, wherein said router is a core router.

10. An apparatus for use in a computer network, comprising:

a router operated by an Internet service provider ("ISP") and providing a connection between a network of the ISP and a first computer operated by a customer of the ISP;

said router including programming that identifies a number of permitted open internet protocol ("IP") sessions for the computer, wherein the number of permitted open IP sessions permitted depends on a level specified by a service plan between the customer and the ISP, said programming further adapted to maintain a count of the IP sessions open between the first computer and the network, receive requests from the first computer to open IP sessions, and compare requests to open IP sessions from the first computer and the number of then existing open IP sessions with the number of permitted open IP sessions, in determining whether to permit opening additional IP sessions to the first computer.

11. The apparatus of claim 10, wherein said programming is further adapted to send a message reporting a request to open one or more sessions in excess of the number of permitted open IP sessions.

12. The apparatus of claim 11, wherein said programming is electronically connected to a controller, and said message is received by said controller.

13. The apparatus of claim 11, wherein said controller is programmed to be able to issue an instruction to said router to override said number of permitted open IP sessions.

14. The apparatus of claim 13, wherein said instruction to override includes reprogramming the programming so that the number of permitted open IP sessions is increased.

15. The apparatus of claim 13, wherein said router is a core router.

16. The apparatus of claim 13, wherein said programming is adapted to maintain a count of the IP sessions that are both open to the first computer and active in transferring information, and to compare requests to open IP sessions from the first computer and the number of then-existing IP sessions that are both open to the first computer and active in transferring information with the number of permitted open IP sessions, in determining whether to permit opening additional IP sessions to the first computer.

17. The apparatus of claim 13, further comprising a controller electronically communicating with said programming in said router, wherein said controller is programmed to send a report to the first computer when a request to open one or more sessions in excess of the number of permitted open IP sessions is received by said programming from the first computer.

* * * * *